United States Patent
Chen et al.

(10) Patent No.: US 12,199,923 B2
(45) Date of Patent: Jan. 14, 2025

(54) INTERFERENCE MEASUREMENT METHOD, DEVICE AND SYSTEM, INTERFERENCE MEASUREMENT INDICATION METHOD AND DEVICE

(71) Applicant: ZTE CORPORATION, Shenzhen (CN)

(72) Inventors: Yijian Chen, Shenzhen (CN); YUNgok Li, Shenzhen (CN); Zhaohua Lu, Shenzhen (CN); Nan Zhang, Shenzhen (CN); Hao Wu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 272 days.

(21) Appl. No.: 16/338,339

(22) PCT Filed: Sep. 27, 2017

(86) PCT No.: PCT/CN2017/103670
§ 371 (c)(1),
(2) Date: Mar. 29, 2019

(87) PCT Pub. No.: WO2018/059440
PCT Pub. Date: Apr. 5, 2018

(65) Prior Publication Data
US 2020/0028654 A1     Jan. 23, 2020

(30) Foreign Application Priority Data
Sep. 30, 2016   (CN) .......................... 201610879235.1

(51) Int. Cl.
*H04L 5/00*      (2006.01)
*H04B 17/336*    (2015.01)
(Continued)

(52) U.S. Cl.
CPC ......... *H04L 5/0073* (2013.01); *H04B 17/336* (2015.01); *H04L 1/0026* (2013.01); *H04L 5/0051* (2013.01); *H04W 24/10* (2013.01)

(58) Field of Classification Search
CPC .... H04B 17/24; H04B 17/336; H04B 17/345; H04B 17/382; H04B 7/0456;
(Continued)

(56) References Cited

U.S. PATENT DOCUMENTS 8,755,477 B1 *  6/2014  Park .................... H04B 7/0871
                                                       375/295
9,774,426 B2 *  9/2017  Seo ....................... H04L 1/0027
(Continued)

FOREIGN PATENT DOCUMENTS

CN      103620977 A     3/2014
CN      104284355 A     1/2015
(Continued)

OTHER PUBLICATIONS

International Search Report for International Application No. PCT/CN2017/103670; Date of Completion: Nov. 22, 2017; Date of Mailing: Dec. 6, 2017; 3 Pages.

*Primary Examiner* — Khaled M Kassim
(74) *Attorney, Agent, or Firm* — Li & Cai Intellectual Property (USA) Office

(57) ABSTRACT

The present disclosure provides an interference measurement method, an apparatus and a system, and an interference measurement indication method and apparatus. The interference measurement method includes: obtaining an interference measurement resource configuration and an interference measurement reception mode configuration; and performing the interference measurement according to the interference measurement resource configuration and the interference measurement receiving mode configuration.

18 Claims, 6 Drawing Sheets

(51) Int. Cl.
*H04L 1/00* (2006.01)
*H04W 24/10* (2009.01)

(58) Field of Classification Search
CPC ... H04B 7/0695; H04L 1/0026; H04L 5/0051; H04L 5/0073; H04W 24/10
See application file for complete search history.

(56) References Cited

U.S. PATENT DOCUMENTS

| | | | | |
|---|---|---|---|---|
| 9,787,383 | B2* | 10/2017 | Seo | H04B 7/0626 |
| 10,637,550 | B2* | 4/2020 | Park | H04B 7/0626 |
| 2012/0327800 | A1 | 12/2012 | Kim et al. | |
| 2013/0225188 | A1* | 8/2013 | Seo | H04W 74/004 |
| | | | | 455/450 |
| 2014/0241200 | A1* | 8/2014 | Chun | H04L 5/0048 |
| | | | | 370/252 |
| 2014/0321407 | A1* | 10/2014 | Seo | H04B 7/0626 |
| | | | | 370/329 |
| 2014/0369221 | A1* | 12/2014 | Fu | H04B 7/2656 |
| | | | | 370/252 |
| 2015/0098347 | A1* | 4/2015 | Guo | H04L 5/0053 |
| | | | | 370/252 |
| 2015/0162966 | A1* | 6/2015 | Kim | H04L 1/20 |
| | | | | 370/252 |
| 2015/0341814 | A1* | 11/2015 | Yu | H04J 11/0023 |
| | | | | 370/252 |
| 2015/0373572 | A1 | 12/2015 | Sahin et al. | |
| 2016/0036542 | A1* | 2/2016 | Gong | H04B 17/345 |
| | | | | 370/329 |
| 2016/0191088 | A1 | 6/2016 | Turlikov et al. | |
| 2016/0192227 | A1 | 6/2016 | Gong et al. | |
| 2016/0242054 | A1* | 8/2016 | Lee | H04L 5/0048 |
| 2017/0034727 | A1* | 2/2017 | Li | H04W 24/08 |
| 2017/0155434 | A1* | 6/2017 | Kim | H04L 5/0051 |
| 2018/0368126 | A1* | 12/2018 | Islam | H04L 1/00 |
| 2019/0116602 | A1* | 4/2019 | Zhang | H04L 5/0073 |
| 2020/0045572 | A1* | 2/2020 | Yum | H04W 52/243 |

FOREIGN PATENT DOCUMENTS

| | | |
|---|---|---|
| CN | 104982055 A | 10/2015 |
| WO | 2013147634 A | 10/2013 |

* cited by examiner

INTERFERENCE MEASUREMENT METHOD, DEVICE AND SYSTEM, INTERFERENCE MEASUREMENT INDICATION METHOD AND DEVICE

CROSS-REFERENCE TO RELATED APPLICATION

This application is the 371 application of PCT Application No. PCT/CN2017/103670, filed Sep. 27, 2017, which is based upon and claims priority to Chinese Patent Application No. 201610879235.1, filed Sep. 30, 2016, the entire contents of which are incorporated herein by reference.

TECHNICAL FIELD

The present disclosure relates to the field of communications, and more particularly, to an interference measurement method, apparatus and system, an interference measurement indication method and apparatus.

BACKGROUND

In the Long Term Evolution (LTE) system, Channel State Information (CSI), which indicates the state of a downlink physical channel, mainly includes the following contents: a Channels Quality Indication (CQI), a Pre-coding Matrix Indicator (PMI), a Rank Indicator (RI) and a pilot resource index (CSI-RS resource index, CRI). Among the information, the CQI is an indicator to measure the quality of downlink channels, and may have an important impact on scheduling actions of network-side devices. In the 3GPP TS 36.213 protocol, the CQI is indicated by integer values of 0-15, which represents different CQI levels, the different CQI levels correspond to their respective modulation mode and coding rate (Modulation and Coding Scheme, MCS), and there are a total of 16 types of conditions, which can be represented by 4-bit information, as shown in Table 1:

TABLE 1

| CQI Index | Modulation mode | Code rate × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In the LTE protocol, a user-side device (User Equipment, UE) selects a CQI index corresponding to a suitable transport block modulation and coding level according to channel quality and recommends the CQI index to a network-side device, such that the network-side device may perform the modulation and coding according to the CQI index to achieve perfect transmission capability of the channels of the network-side device. Therefore, the CQI may also be understood as quantization of channel quality information. If the channel quality is good, it can support relatively high-order modulation and coding modes to obtain a relatively high speed. If the channel quality is poor, the transmission can only be performed in a relatively low-order modulation and coding mode to guarantee robustness of the transmission.

In a Multiple-Input Multiple-Output (MIMO) system, if the channel quality is performed in an implicit manner, it is recommended that there are generally hypotheses as follows for the CQI index.

(1) The network-side device uses a recommended RI as a layer number for spatial multiplexing and transmits RI pieces of data, and a layer mapping manner defined in the protocol.

(2) The recommended PMI is used to pre-code signals.

(3) Interference and noise are measured by the UE.

According to (1), (2) and (3) and adopting a receiving algorithm used by the terminal in actual, the CQI is computed based on the Signal to Interference plus Noise Ratio (SINR) obtained by the processing of the receiving algorithm.

The accuracy of computation and selection of RI/PMI/CQI is affected by two aspects: channel measurement, and interference and noise measurement.

Another manner is reporting the interference in an explicit manner, and the useful signal is calculated voluntarily on the network-side device according to the used transmission technology and transmitting power. Under this manner, it requires the terminal to measure and report the interference.

Therefore, whether the CQI is measured at the terminal side or the CQI is computed by the network-side device, the terminal needs to measure the interference, so that the channel quality can be accurately reflected, and then the transmission can be performed most efficiently. Consequently, an accurate interference measurement is an important condition for guaranteeing full use of the system performance. Incorrect interference information may cause the number of layers to not match the actual channel quality state. For example, only two layers can be supported in practical, yet the channel is misjudged to be able to support 4 layers due to measurement errors of interference and noise information, which may result in a high bit error rate. Or, in practical only a lower-order coding and modulating mode can be supported, yet it is misjudged to be able to support a higher-order coding and modulating mode, which may also lead to an excessively high bit error rate. Contrariwise, it is possible that a higher-order coding and modulating mode can be supported, yet in practical only less layers are used and transmission is performed in a lower-order coding method, thereby resulting in a waste of transmission resources.

At present, there are a plurality of interference measurement methods, mainly including two methods.

Interference is measured based on reference pilot, including: the interference is measured based on CRS, the interference is measured based on CSI-RS, and the interference is measured based on proprietary demodulated pilot.

Interference is measured based on the Interference Measurement Resource (Interfere Measurement Resource, IMR), which is a proprietary resource for interference measurement.

The idea of the interference measurement based on reference pilot is taking the interference undergone by the reference pilot as the interference undergone by data signal (Data). First the reference signal is correctly estimated, and then the residual is the interference. In this measurement method, it is considered that the reference signal and the data are subjected to similar interference. In the case of high density of the pilot, correlation of channels may be used to distinguish interference information from reference signal information, thereby the performance of channel estimation is also relatively good. This measurement method is an early interference measurement method in the LTE.

Another method is performing interference measurement according to the IMR. Since the IMR is configurable and no signal is transmitted by its own cell, the measured interferences are all interferences of other cells. Different IMR positions may correspond to different interferences. Compared with the aforementioned method for performing interference measurement based on reference pilot, the advantage of this method is that it can flexibly assign interference measurement resources and measure the features of interference signals expected to be learned, and since in this method the measured signals are all interferences, there is no aliasing with useful signals, and the accuracy is higher. In LTE-A, this method is mainly used.

In the related art, 4G is generally considered to have relatively few antennas at the receiving end, and the direction of the receiving antenna is substantially omnidirectional, thereby the receiving mode is relatively fixed, and the measured interference is relatively little affected by the receiving mode.

From a perspective of the channel, a signal arrives at a receiving end through a plurality of paths. If the receiving end receives via an omnidirectional wide beam, the receiving end will receive interferences in individual directions.

With the development of technology, in the communication system, the transmitting end and the receiving end generally use a plurality of antennas to transmit and receive for obtaining a relatively high rate, which also enables the transmitting and receiving ends to have beam-forming capability, and the beam may be aligned with a certain direction for receiving so as to obtain relatively great transmitting and receiving efficiency, which is equivalent to having a good bundling effect. At the same time, beams of different nodes may be staggered to reduce interference.

In the related interference measurement technology, the network-side device at the transmitting end only specifies the resource for interference measurement, yet does not restrict the receiving mode of interference of the receiving end, because mainstream configurations all use the omnidirectional wide beam for receiving, and although interference restraining capabilities of some classic receivers are different, the difference is not particularly large, the interference measurement results may be considered to be basically the identical. However, with the development of technology, the receiving end introduces a plurality of antennas to form a narrow beam, and there are a plurality of receiving channels, which will be a trend. The 5G research requirement report TR 36.913 published by the 3GPP specifically mentions the configuration of the terminal receiving antenna as follows:

Round 30 GHz or Around 70 GHz: Up to 32 Tx and Rx antenna elements;

Around 4 GHz: Up to 8 Tx and Rx antenna elements.

There are many possible receiving methods with a plurality of receiving antennas. It is known that a plurality of antennas of the receiving end may be divided into a plurality of receiving channels (RXU), and each receiving channel may adopt different receiving beam directions and widths; among those receiving channels, some receiving weights may also be set, so that there is a lot of uncertainty in the interference measurement. Using different narrow beams, selecting or combining different RXUs, the obtained results of interference measurements are completely different, and the difference may be up to several tens of dB; if the measurement is just aligned with interference, the interference may be amplified, while if the measurement is not aligned with interference, the interference may be almost zero. In general, the more antennas at the receiving end are, the narrower the beam is, and the greater the uncertainty of measurement results is.

In the situation that there is a diversity of receiving modes at the receiving end, if there is no agreement, how to measure the result of the interference measurement is unknown to the network-side device; in this case, the network-side device cannot effectively utilize interference cancellation capability of the receiving end to perform relatively accurate interference coordination in the absence of this part of information; a control capability of interference coordination in the receiving space is lost; and in the situation that receiving modes of the receiving end has a large amount of flexible selections, there are also fairness issues among UEs due to different interference measurement criteria. Some terminals may use the problem that is not agreed by the protocol, adopt some receiving methods with always small interference to perform interference measurement, report small interference and obtain more scheduling opportunities, which cannot objectively reflect the actual interferences of each terminal, and the network-side device cannot schedule in an optimal manner, which affects the overall performance of the network; the network-side device has no way to control the interference measurement behavior of the terminal to obtain some more expected interference information, for example, it expects to measure the amount of interference in certain directions.

Therefore, with respect to the problem in the related art that since increasing of the number of receiving antennas leads to different interference measurement criteria among UEs, the UE cannot objectively reflect the actual interference, and it is difficult for the network-side device to control interference measurement on the UE, there is no relatively good solution.

This section provides background information related to the present disclosure which is not necessarily prior art.

SUMMARY

The embodiments of the present disclosure provides an interference measurement method, apparatus and system, an interference measurement indication method, apparatus and system to at least solve the problem in the related art that since increasing of the number of receiving antennas leads to different interference measurement criteria among UEs, the UE cannot objectively reflect the actual interference, and it is difficult for the network-side device to control interference measurement on the UE.

According to an embodiment of the present disclosure, there is provided an interference measurement method, including: obtaining an interference measurement resource configuration and an interference measurement receiving mode configuration; and performing an interference measurement according to the interference measurement resource configuration and the interference measurement receiving mode configuration.

According to another embodiment of the present disclosure, there is provided an interference measurement indication method, including: obtaining at least one set of interference measurement resources and corresponding interference measurement receiving mode configurations; and respectively sending interference measurement resource configurations and the interference measurement receiving mode configurations corresponding to the interference measurement resources to user equipment.

According to another embodiment of the present disclosure, there is provided an interference measurement apparatus, including: an obtaining module configured to obtain an interference measurement resource configuration and an interference measurement receiving mode configuration; and a measuring module configured to perform an interference measurement according to the interference measurement resource configuration and the interference measurement receiving mode configuration.

According to another embodiment of the present disclosure, there is provided an interference measurement system, including: a network-side device configured to obtain at least one set of interference measurement resources and corresponding interference measurement receiving mode configurations; and respectively send interference measurement resource configurations and the interference measurement receiving mode configurations corresponding to the interference measurement resources to user equipment; and the user equipment configured to obtain the interference measurement resource configurations and the interference measurement receiving mode configurations; and perform an interference measurement according to the interference measurement resource configuration and the interference measurement receiving mode configuration.

According to another embodiment of the present disclosure, there is provided a storage medium configured to store program codes used to execute the following steps.

In S1, an interference measurement resource configuration and an interference measurement receiving mode configuration is obtained.

In S2, an interference measurement is performed according to the interference measurement resource configuration and the interference measurement receiving mode configuration.

According to another embodiment of the present disclosure, there is provided a storage medium configured to store program codes used to execute the following steps.

In S1, at least one set of interference measurement resources and corresponding interference measurement receiving mode configurations are obtained.

In S2, interference measurement resource configurations and the interference measurement receiving mode configurations corresponding to the interference measurement resources are sent to user equipment.

Optionally, the storage medium is further configured to store program codes used to execute the following steps.

In S3, the interference measurement resources are divided into a plurality of groups.

In S4, indication signaling of receiving modes is configured for measurement interference pilot resources in a plurality of groups of the measurement interference resources.

Through the embodiments of the present disclosure, an interference measurement between a network-side device and UE is performed after a corresponding receiving mode is pre-set according to an interference measurement receiving mode configuration, therefore, the problem in the related art that since increasing of the number of receiving antennas leads to different interference measurement criteria among the UEs, the UE cannot objectively reflect the actual interference, and it is difficult for the network-side device to control interference measurement on the UE can be solved, and effects that the UE better predicts true interference during transmission and more dimensions for interference coordination are provided for the network-side device are achieved.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated here serve to provide a further understanding of the present disclosure and constitute a part of the present application, and the illustrative embodiments of the present disclosure together with the description thereof serve to explain the present disclosure, but do not constitute inappropriate definition to the present disclosure. In the drawings.

DETAILED DESCRIPTION

The present disclosure will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily used to describe a specific sequence or a chronological order.

First Embodiment

The method embodiment provided by the first embodiment of the present disclosure may be executed in a mobile terminal, a computer terminal or some arithmetical device like that. Taking running on a terminal for an example, FIG.

Figure 1:
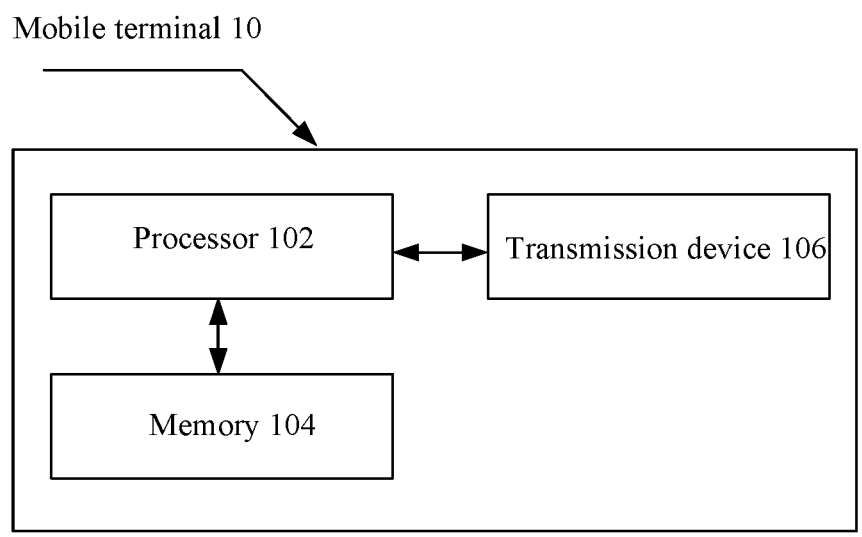
FIG. 1 is a hardware structure diagram of a mobile terminal of an interference measurement method according to an embodiment of the present disclosure.

1 is a hardware structure diagram of a mobile terminal of an interference measurement method according to an embodiment of the present disclosure. As shown in FIG. 1, the mobile terminal 10 may include one or more (only one is shown in FIG. 1) processor 102, which may include, but is not limited to, a microprocessor (MPU), a programmable logic device FPGA or other processing units, a memory 104 for storing data, and a transmission device 106 for communication. It is understandable for those skilled in the art that the structure shown in FIG. 1 is only illustrative, and do not constitute definition to the structure of the above electronic devices. For instance, the terminal 10 may include more or less components than those illustrated in FIG. 1, or has different configurations from those illustrated in FIG. 1.

The memory 104 may be configured to store software programs and modules of the application software, such as the program instructions/modules corresponding to the interference measurement method in the embodiments of the present disclosure, and the processor 102 performs various functional applications and data processing, that is, implements the above method, by running the software programs and modules stored in the memory 104. The memory 104 may include a high-speed random access memory and also a non-volatile memory, such as one or more magnetic storage devices, a flash memory, or other non-volatile solid state memory. In some examples, the memory 104 may further include memories remotely located relative to the processor 102, and these remote memories may be connected to the terminal 10 via a network. Examples of such network include, but are not limited to, Internet, intranet, local area network, mobile communication network, and combinations thereof.

The transmission device 106 is configured to receive or transmit data via a network. A specific example of the above network may include a wireless network provided by a communication provider of the terminal 10. In one example, the transmission device 106 includes a Network Interface Controller (NIC) that may be connected to other network devices through a base station to communicate with the Internet. In one example, the transmission device 106 may be a Radio Frequency (RF) module for communicating with the Internet wirelessly.

Figure 2:
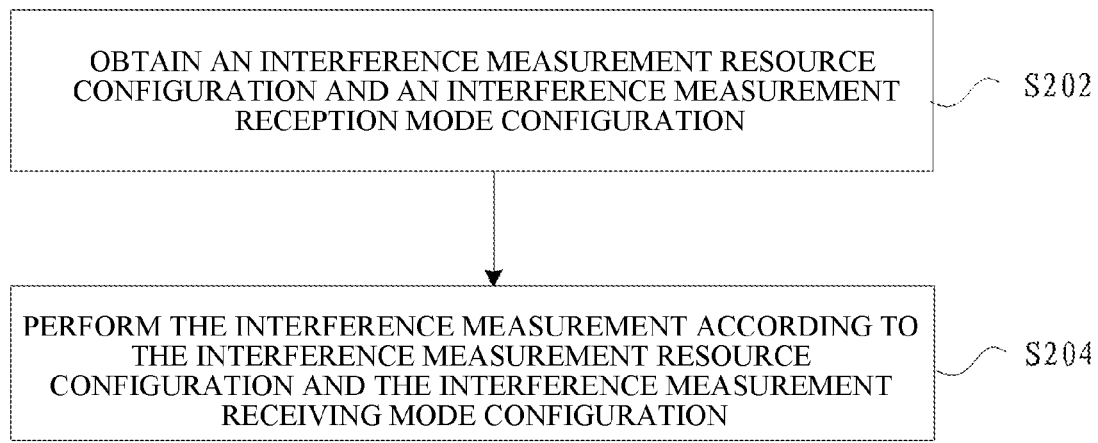
FIG. 2 is a flow chart of an interference measurement method according to an embodiment of the present disclosure.

The present embodiment provides an interference measurement method running on the terminal shown in FIG. 1. FIG. 2 is a flow chart of an interference measurement method according to an embodiment of the present disclosure. As shown in FIG. 2, the flow includes the steps as follows.

In S202, an interference measurement resource configuration and an interference measurement receiving mode configuration are obtained.

It should be noted that a selection of an interference measurement resource is generally determined by a network-side device on a zero-power measurement pilot. In order to better measure the interference measurement resources, in the present embodiment, it is default that a serving cell that is working does not send any signal, and measured signals are interference signals from other non-serving cells. Table 2 is an interference resource measurement table according to an embodiment of the present disclosure. Table 2 is shown as follows.

TABLE 2

| | Serving cell | Interference cell 1 | Interference cell 2 | Interference cell 3 |
|---|---|---|---|---|
| IMR 1 | Not sent | Sent | Not sent | Not sent |
| IMR 2 | Not sent | Not sent | Sent | Not sent |
| IMR 3 | Not sent | Not sent | Not sent | Sent |
| IMR 4 | Not sent | Not sent | Sent | Sent |
| IMR 5 | Not sent | Sent | Sent | Not sent |
| IMR 6 | Not sent | Sent | Not sent | Sent |
| IMR 7 | Not sent | Sent | Sent | Sent |

Therefore, it is understandable that the interference measurement resources described in the present disclosure actually corresponds to interferences of different non-working cells.

Optionally, the interference measurement resource configuration includes: an interference intensity and an interference characteristic of the interference cell. In addition, interference information generated among a plurality of interference cells may be superimposed. Therefore, the interference measurement resource configuration in the present embodiment should actually further include superimposed interference intensity and interference characteristic.

It should be noted that each interference measurement resource may flexibly correspond to different interference measurement resource configurations. For example, Table 3 is a corresponding table between the interference measurement resources and their configurations according to the present embodiment. Table 3 is shown as follows.

TABLE 3

| | Interference measurement resource configurations |
|---|---|
| IMR 1 | Measure interference intensity and characteristic of interference cell 1 |
| IMR 2 | Measure interference intensity and characteristic of interference cell 2 |
| IMR 3 | Measure interference intensity and characteristic of interference cell 3 |
| IMR 4 | Measure superimposed interference intensity and characteristic of interference cell 2 and interference cell 3 |
| IMR 5 | Measure superimposed interference intensity and characteristic of interference cell 1 and interference cell 2 |
| IMR 6 | Measure superimposed interference intensity and characteristic of interference cell 1 and interference cell 3 |
| IMR 7 | Measure superimposed interference intensity and characteristic of interference cell 1, interference cell 2 and interference cell 3 |

Optionally, the interference measurement resource configuration may be obtained from configuration signaling of the network-side device; the network-side device may predefine some patterns for resource locations, and the corresponding interference measurement resource configurations may be determined according to the above mentioned patterns.

It should be noted that the interference measurement resource may be a periodic resource or a resource transmitted in a multi-shot manner. The interference measurement resource may also be a once-transmitted resource, which exists only in one sub-frame.

Optionally, the interference measurement receiving mode configuration includes at least one of followings: a configuration of receiving antenna, a configuration of receiving beam, a configuration of a range of receiving direction, a configuration of a polarization manner of receiving and a configuration of receiving weight.

Optionally, it is easy to understand for those skilled in the art that the interference measurement receiving mode includes: a receiving antenna, a receiving beam, a range of receiving direction, a polarization manner of receiving and a receiving weight.

Specifically, Table 4 shows interference measurement receiving modes corresponding to receiving antennas. Table 4 is shown as follows.

TABLE 4

| | Interference measurement receiving modes |
|---|---|
| Receiving 1a | Received by receiving antenna panel 1 |
| Receiving 1b | Received by receiving antenna panel 2 |
| Receiving 1c | Received by receiving antenna panels 1 and 2 |

It should be noted that the receiving antenna panels in Table 4 may be replaced by receiving antenna units, receiving antenna ports, receiving passages or other antenna components with a receiving antenna function.

Specifically, Table 5 shows interference measurement receiving modes corresponding to receiving weights. Table 5 is shown as follows.

TABLE 5

| | Interference measurement receiving modes |
|---|---|
| Receiving 2a | Receiving weight 1 |
| Receiving 2b | Receiving weight 2 |
| Receiving 2c | Receiving weight 3 |
| Receiving 2d | Receiving weight 4 |

It should be noted that the above-mentioned receiving weights include: receiving weights of antennas of a same polarization direction and receiving weights of antennas of different polarization directions.

Specifically, Table 6 shows interference measurement receiving modes corresponding to ranges of receiving directions. Table 6 is shown as follows.

TABLE 6

| | Interference measurement receiving modes |
|---|---|
| Receiving 3a | Measure interference within 0-180 degree in the horizontal direction and 45-90 degree in the vertical direction |
| Receiving 3b | Measure interference within 0-180 degree in the horizontal direction and 90-135 degree in the vertical direction |
| Receiving 3c | Measure interference within 180-360 degree in the horizontal direction and 45-90 degree in the vertical direction |
| Receiving 3d | Measure interference within 180-360 degree in the horizontal direction and 90-135 degree in the vertical direction |

Specifically, Table 7 shows interference measurement receiving modes corresponding to receiving beams. Table 7 is shown as follows.

TABLE 7

| | Interference measurement receiving modes |
|---|---|
| Receiving 4a | Receiving beam 1 |
| Receiving 4b | Receiving beam 2 |

TABLE 7-continued

| | Interference measurement receiving modes |
|---|---|
| Receiving 4c | Receiving beam 3 |
| Receiving 4d | Receiving beam 4 |
| Receiving 4e | Receiving beam 5 |
| Receiving 4f | Receiving beam 6 |
| Receiving 4g | Receiving beam 7 |
| Receiving 4h | Receiving beam 8 |

It should be noted that it may also be the receiving weight that corresponds to the index of the receiving beam.

Optionally, the interference measurement receiving mode may be determined according to configuration signaling of a network-side device. For example, the network-side device sends a receiving mode corresponding to a receiving beam to user equipment via high-layer signaling. After receiving the receiving mode corresponding to the receiving beam in the high-layer signaling, the user equipment performs corresponding receiving according to the receiving modes of Table 6.

Specifically, when there are a plurality of interference measurement resource groups, receiving modes corresponding to the plurality of interference measurement resources are respectively determined according to configuration signaling corresponding to the plurality of interference measurement resources.

Optionally, the above-mentioned configuration signaling includes: signaling in an explicit manner and signaling in an implicit manner.

Specifically, if signaling in an explicit manner is used to perform indication, then it may be understood that corresponding receiving modes are determined according to a predetermined corresponding relationship between the interference measurement resources and the receiving modes.

Specifically, if signaling in an implicit manner is used to perform indication, then it required to find a bundling relationship or correlated signal corresponding to the receiving modes.

Optionally, an interference measurement receiving mode may be determined according to a receiving mode of a configured first type of signals.

It should be noted that the first type of signals at least includes: a downlink measurement pilot, a downlink demodulation pilot, an uplink demodulation pilot, an uplink measurement pilot and an uplink random access signal.

Optionally, a resource location of the first type of signal associated with the interference measurement receiving mode is determined according to a convention or indication information.

Optionally, the resource location of the first type of signal includes: a port, a time domain location.

It should be noted that the above-mentioned convention refers to pre-configured association information between a network-side device and user equipment. After acquiring an interference measurement receiving mode configuration according to the convention, the user equipment may determine the port, the time domain location or other resource locations associated with the interference measurement receiving mode.

It should be noted that the above-mentioned indication information refers to configured information by the network-side device. After acquiring an interference measurement receiving mode configuration according to the indication information, the user equipment may determine the port, the time domain location or other resource locations associated with the interference measurement receiving mode.

Optionally, an interference measurement receiving mode may be determined according to a transmitting beam configured by the network-side device.

Specifically, when there are a plurality of candidate transmitting beams, the interference measurement receiving mode may be determined according to indication signaling of the network-side.

Optionally, the receiving mode when measuring interference is determined according to the optimum receiving beam corresponding to the transmitting beam.

Optionally, an interference measurement receiving mode may be determined according to a beam selected and fed back by the user equipment.

Specifically, when there are a plurality of the selected and fed back beams, the interference measurement receiving mode is determined according to indication signaling of the network-side device.

Optionally, the receiving mode when interference is measured is determined according to the optimum receiving beam corresponding to the feedback beam.

Optionally, an interference measurement receiving mode may be determined according to a time domain location to which an interference measurement resource belongs.

In S204, an interference measurement is performed according to the interference measurement resource configuration and the interference measurement receiving mode configuration.

Optionally, the user equipment receives and measures an interference signal on the interference measurement resource according to a determined interference measurement resource receiving mode.

Optionally, after an interference measurement is performed, a result of the interference measurement is fed back to the network-side device.

Specifically, manners of feedback include: an explicit manner of feedback and an implicit manner of feedback. It should be noted that the explicit manner of feedback is to feed back a size of feedback interference, interference correlation matrix or other information that can directly reflect the interference measurement result. And the implicit manner of feedback is that a determined CQI is sent to the network-side device after being combined with a signal measurement part.

Through the steps above, the problem in the related art that since increasing of the number of receiving antennas leads to different interference measurement criteria among UEs, the UE cannot objectively reflect the actual interference, and it is difficult for the network-side device to control interference measurement on the UE, is solved, and effects that the UE better predicts true interference during transmission and provides more dimensions for interference coordination for the network-side device, are achieved.

Through the description of the above embodiments, those skilled in the art can clearly understand that the method according to the foregoing embodiment can be implemented by means of software with a necessary general hardware platform, and can also be implemented by means of hardware, but in many cases the former is a better implementation. Based on such understanding, the technical solution in essence or the portion contributing to the related art of the embodiments of the present disclosure may be embodied in the form of a software product, which is stored in a storage medium, such as a Read-Only Memory (ROM)/Random Access Memory (RAM), a magnetic disc and an optical disc, the storage medium includes a plurality of instructions for enabling a terminal device (may be a mobile phone, a computer, a server, or a network device, etc.) to perform the methods described in various embodiments of the present disclosure.

Second Embodiment

Figure 3:
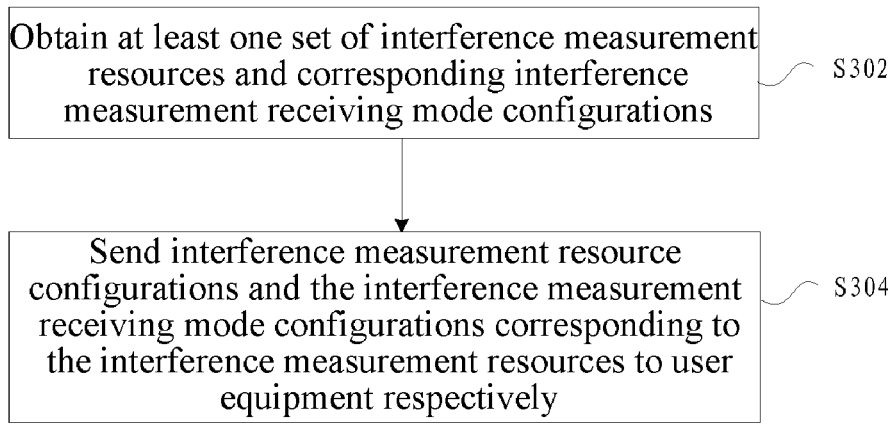
FIG. 3 is a flow chart of an interference measurement indication method according to an embodiment of the present disclosure.

The present embodiment provides an interference measurement indication method running on the terminal shown in FIG. 1. FIG. 3 is a flow chart of an interference measurement indication method according to the embodiments of the present disclosure. As shown in FIG. 3, the flow includes the following steps.

It should be noted that definitive descriptions related to the interference measurement resource, the interference measurement resource configuration, the interference measurement receiving mode and the interference measurement receiving mode configuration have been illustrated in detail in the first embodiment. Therefore, corresponding descriptions of the above terms will be omitted in order to avoid illustration repetition.

In S302, one or more sets of interference measurement resources and corresponding interference measurement receiving mode configurations are obtained.

In S304, interference measurement resource configurations and the interference measurement receiving mode configurations corresponding to the interference measurement resources are respectively send to user equipment.

Figure 4:
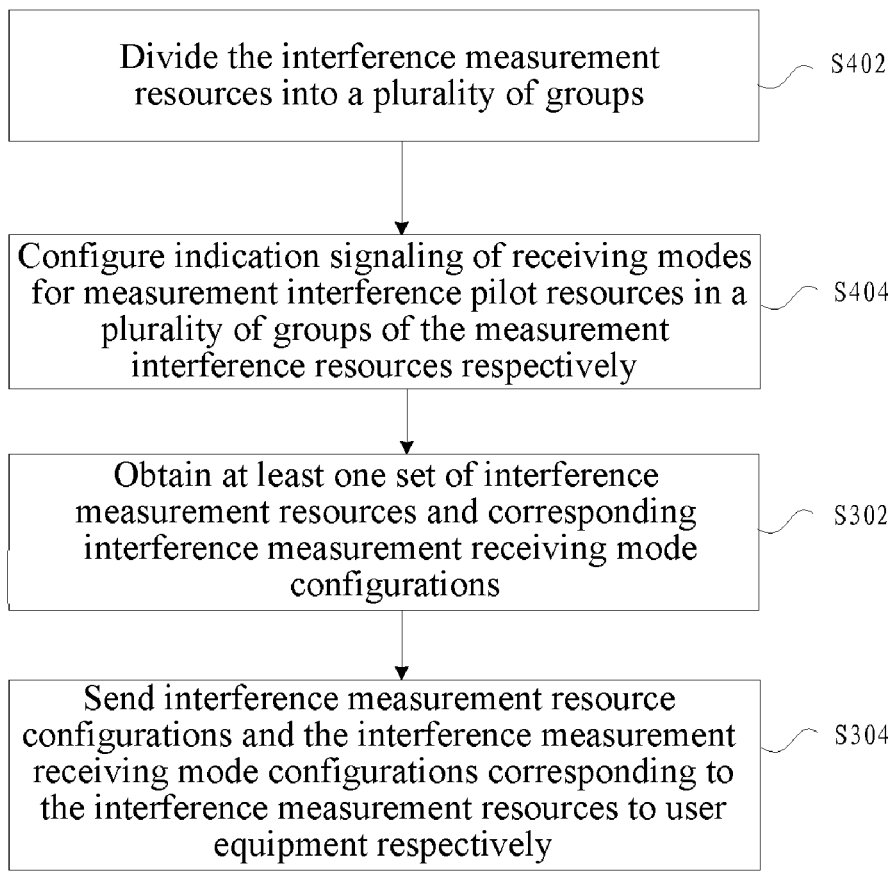
FIG. 4 is a flow chart of another interference measurement indication method according to an embodiment of the present disclosure.

FIG. 4 is a flow chart of another interference measurement indication method according to the embodiments of the present disclosure. As shown in FIG. 4, based on including the steps shown in FIG. 3, the flow further includes the following steps.

In S402, the interference measurement resources are divided into a plurality of groups.

Specifically, the interference measurement resources may be divided into a plurality of groups. The division manner at least includes the followings.

(1) When there are M sets of interference measurement resources and M>1, a simple division manner is that M sets of interference measurement resources are divided into N groups, where M>=N. Each group of interference measurement resources may include one or more sets of interference measurement resources.

Figure 5:
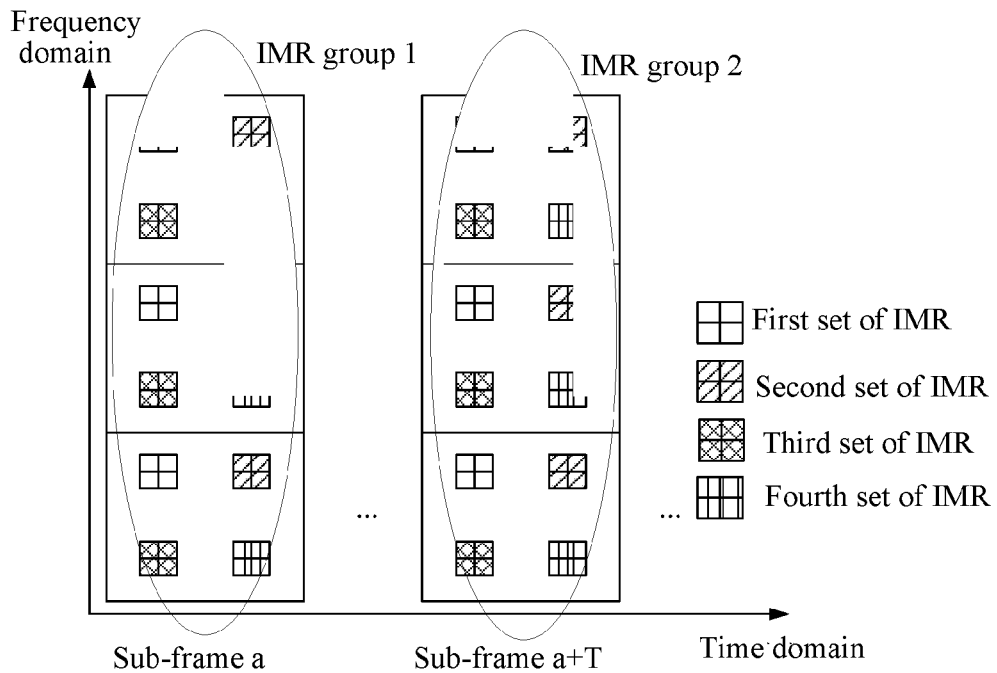
FIG. 5 is a schematic diagram of a grouping method of interference measurement resources according to an embodiment of the present disclosure.

(2) The interference measurement resources are divided according to a time domain resource, and the interference measurement resources are divided into a plurality of groups in the time domain. FIG. 5 is a schematic diagram of a grouping method of interference measurement resources according to the embodiments of the present disclosure. As shown in FIG. 5, the interference measurement resources of different sub-frames are divided into different groups, yet if the interference resources are periodic resources, there are plenty of numbers of sets after the grouping. Therefore, a typical division manner is to divide into sub-frame sets and the interference measurement resources in different sub-frame sets belong to different groups.

Figure 6:
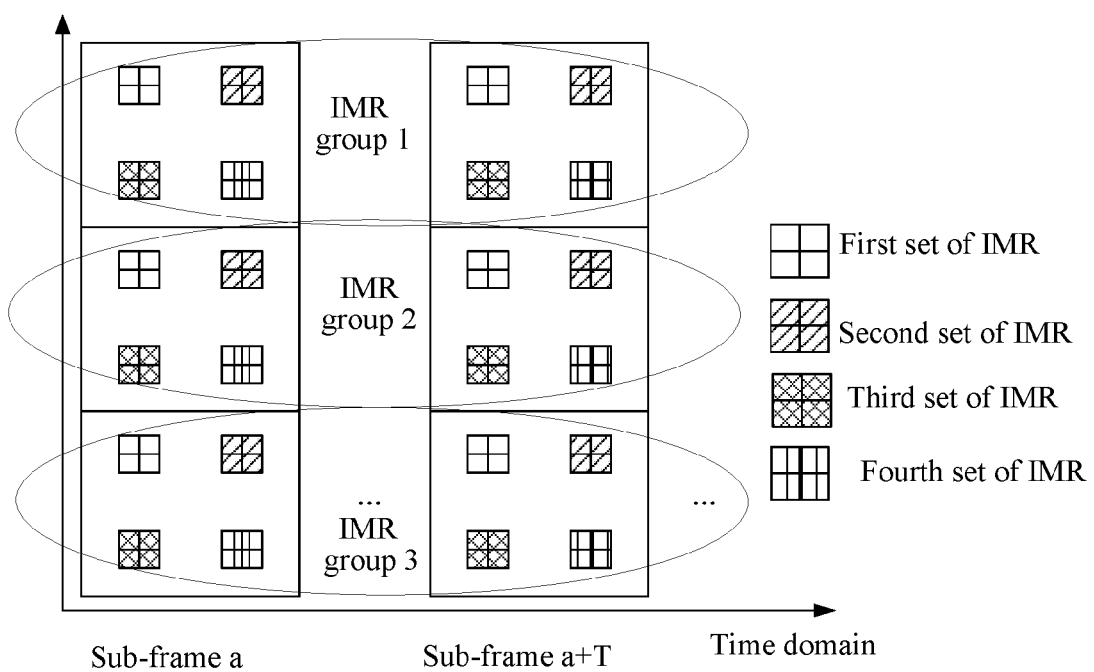
FIG. 6 is a schematic diagram of another grouping method of interference measurement resources according to an embodiment of the present disclosure.

(3) The interference measurement resources are divided according to a frequency domain resource, and the interference measurement resources are divided into a plurality of groups in the frequency domain. FIG. 6 is a schematic diagram of another grouping method of interference measurement resources according to the embodiments of the present disclosure. As shown in FIG. 6, the interference measurement resources of different sub-bands are divided into different groups, yet if the number of sub-bands with relatively large bandwidths is relatively large, there are plenty of numbers of sets after the grouping. Therefore, a typical division manner is to divide into sub-band sets and the interference measurement resources in different subband sets belong to different groups.

(4) The interference measurement resources are divided according to indication information corresponding to grouping modes configured by the network-side device.

The network-side device may indicate interference measurement resource groups to which the interference measurement resources correspondingly belong via an indication instruction. At the same time, the user equipment also determines a corresponding grouping mode according to the indication information.

It should be noted that when the network-side device performs grouping, the above three grouping modes may be combined and the grouping is flexibly performed. At the same time, the network-side device may also configure a corresponding receiving mode for each interference measurement resource group.

In S404, indication signaling of receiving modes for measurement interference pilot resources in a plurality of groups of the measurement interference resources is configured respectively.

Optionally, the indication signaling of the interference measurement receiving modes is configured to indicate the user equipment to receive the interference measurement resources from one or more weights in a set of receiving weight codebook.

Optionally, the codebook includes: an uplink transmitting codebook and a downlink receiving codebook.

Specifically, using the uplink transmitting codebook means that transmitting of uplink and receiving of downlink have a same antenna configuration; and at this time, the indication signaling may indicate codes of the uplink transmitting codebook to correspond to the receiving weights, and used to determine a receiving mode when interference is measured.

Specifically, codes included in the downlink transmitting codebook may be pre-agreed or configurable; the indication signaling may indicate codes thereof to correspond to the receiving weights, and used to determine a receiving mode when interference is measured.

Optionally, the indication signaling is configured to indicate a type of a first type of signals associated with the interference measurement receiving modes; and the interference measurement receiving modes are determined according to a receiving mode corresponding to the associated first type of signal.

Optionally, the indication signaling is configured to indicate a type of a first type of signals associated with the interference measurement receiving modes; and the interference measurement receiving modes are determined according to a receiving mode corresponding to the associated first type of signal.

Specifically, the first type of signals includes: a downlink measurement pilot, a downlink demodulation pilot, an uplink demodulation pilot, an uplink measurement pilot and an uplink random access signal.

Optionally, the indication signaling is configured to indicate a resource location of first type of signal associated with the interference measurement receiving modes; the interference measurement receiving modes are determined according to a receiving mode corresponding to the associated first type of signal.

Optionally, the resource location of first type of signal includes: a port, a time domain location.

Optionally, it has been illustrated correspondingly in the first embodiment that using the first type of signaling namely corresponds to the network-side device indicates the user equipment to determine the interference measurement receiving modes via signaling in an implicit manner.

Optionally, the indication signaling is configured to indicate a bundling relationship of receiving modes among the plurality of sets of interference measurement resources.

Optionally, the interference measurement receiving mode indicated by the signaling in an implicit manner is invisible to the network-side device. Therefore, it is necessary to first find a binding relationship or a correlated signal corresponding to the receiving mode. It should be noted that the above-mentioned binding relationship represents a relevance of the receiving modes. And the relevance includes: a sameness relationship and other relationships. Table 8 provides a method for determining interference measurement resource receiving modes according to ports of bundled signals. Table 8 is shown as follows.

TABLE 8

| IMR | Bundled signals |
|---|---|
| IMR group 1 | Port a of a bundled signal |
| IMR group 2 | Port b of a bundled signal |

Table 9 provides a method for determining interference measurement resource receiving modes according to ports and time domain locations of bundled signals. Table 9 is shown as follows.

TABLE 9

| IMR | Bundled signals |
|---|---|
| IMR group 1 | Port a, time domain location t1 of a bundled signal |
| IMR group 2 | Port b, time domain location t2 of a bundled signal |

Optionally, the indication signaling is configured to indicate a transmitting beam associated with the interference measurement receiving modes.

Optionally, the indication signaling is configured to indicate a feedback beam associated with the interference measurement receiving modes.

Through the steps above, the problem in the related art that since increasing of the number of receiving antennas leads to different interference measurement criteria among UEs, the UE cannot objectively reflect the actual interference, and it is difficult for the network-side device to control interference measurement on the UE, is solved, and effects that the UE better predicts true interference during transmission and more dimensions for interference coordination are provided for the network-side device are achieved.

Through the description of the above embodiments, those skilled in the art can clearly understand that the method according to the foregoing embodiment can be implemented by means of software with a necessary general hardware platform, and can also be implemented by means of hardware, but in many cases the former is a better implementation. Based on such understanding, the technical solution in essence or the portion contributing to the related art of the embodiments of the present disclosure may be embodied in the form of a software product, which is stored in a storage medium, such as a Read-Only Memory (ROM)/Random Access Memory (RAM), a magnetic disc and an optical disc, the storage medium includes a plurality of instructions for enabling a terminal device (may be a mobile phone, a computer, a server, or a network device, etc.) to perform the methods described in various embodiments of the present disclosure.

Third Embodiment

The present embodiment further provides an interference measurement apparatus, which is used to implement the above embodiments and preferred embodiments, and the description which has been given will be omitted. As used below, the term "module" may implement a combination of software and/or hardware of a predetermined function. Although the apparatuses described in the following embodiments are preferably implemented in software, hardware or a combination of software and hardware is also possible and contemplated.

Figure 7:
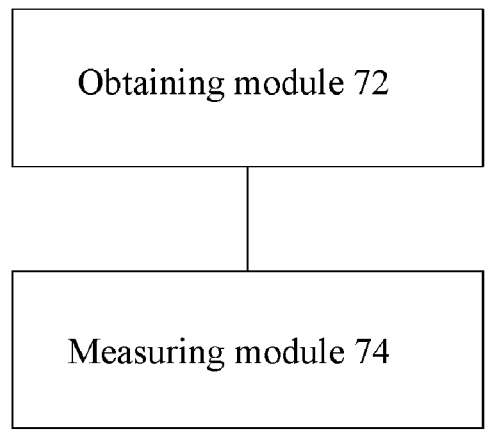
FIG. 7 is a structural diagram of an interference measurement apparatus according to an embodiment of the present disclosure.

FIG. 7 is a structural diagram of an interference measurement apparatus according to the embodiments of the present disclosure. As shown in FIG. 7, the apparatus includes: an obtaining module 72 and a measuring module 74.

The obtaining module 72 is configured to obtain an interference measurement resource configuration and an interference measurement receiving mode configuration.

The measuring module 74 is configured to perform an interference measurement according to the interference measurement resource configuration and the interference measurement receiving mode configuration.

Optionally, an interference receiving mode corresponding to the interference measurement receiving mode configuration is determined by means of at least one of followings: determined according to configuration signaling of a network-side device; determined according to a receiving mode of a configured first type of signals; a first type of signal resource locations associated with the interference measurement receiving mode is determined according to a convention or indication information; determined according to a transmitting beam configured by a network-side device; determined according to a beam selected and fed back by user equipment; and determined according to a time domain location to which an interference measurement resource belongs.

It should be noted that preferred embodiments in the present embodiment may refer to related descriptions in the first embodiment and the second embodiment, and the descriptions will be omitted herein.

Fourth Embodiment

The present embodiment further provides an interference measurement apparatus, which is used to implement the above embodiments and preferred embodiments, and the description which has been given will be omitted. As used below, the term "module" may implement a combination of software and/or hardware of a predetermined function. Although the apparatuses described in the following embodiments are preferably implemented in software, hardware or a combination of software and hardware is also possible and contemplated.

Figure 8:
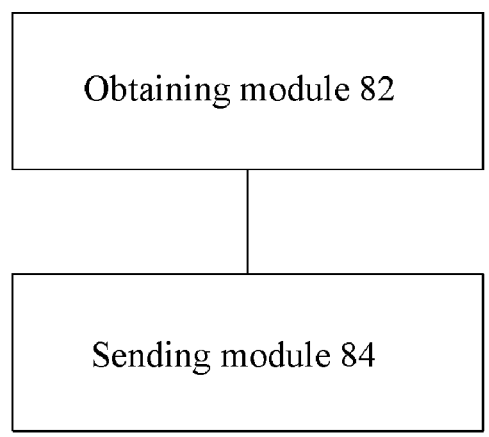
FIG. 8 is a structural diagram of an interference measurement indication apparatus according to an embodiment of the present disclosure.

FIG. 8 is a structural diagram of an interference measurement indication apparatus according to the embodiments of the present disclosure. As shown in FIG. 8, the apparatus includes: an obtaining module 82 and a sending module 84.

The obtaining module 82 is configured to obtain one or more sets of interference measurement resources and corresponding interference measurement receiving mode configurations.

The sending module 84 is configured to respectively send interference measurement resource configurations and the interference measurement receiving mode configurations corresponding to the interference measurement resources to the user equipment.

Figure 9:
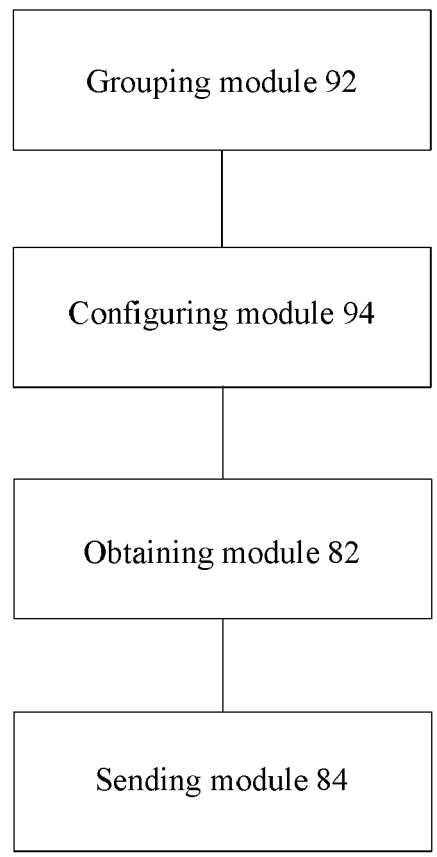
FIG. 9 is a structural diagram of another interference measurement indication apparatus according to an embodiment of the present disclosure.

FIG. 9 is a structural diagram of another interference measurement indication apparatus according to the embodiments of the present disclosure. As shown in FIG. 9, except for including all the modules shown in FIG. 8, the apparatus further includes:

a grouping module 92 configured to divide the interference measurement resources into a plurality of groups; and a configuring module 94 configured to respectively configure indication signaling of receiving modes for measurement interference pilot resources in a plurality of groups of the measurement interference resources.

It should be noted that each of the above modules may be implemented by software or hardware. For the latter, the foregoing may be implemented by, but not limited to, the following way: the foregoing modules are all set in the same processor; or, the above modules are set in different processors in the form of any combination.

It should be noted that preferred embodiments in the present embodiment may refer to related descriptions in the first embodiment and the second embodiment, and the descriptions will be omitted herein.

Fifth Embodiment

Figure 10:
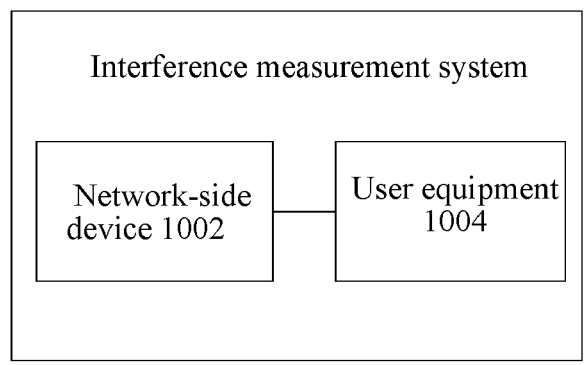
FIG. 10 is a structural diagram of an interference measurement system according to an embodiment of the present disclosure.

The present embodiment further provides an interference measurement system. FIG. 10 is a structural diagram of an interference measurement system according to the embodiments of the present disclosure. As shown in FIG. 10, the apparatus includes: a network-side device 1002 and user equipment 1004.

The network-side device 1002 is configured to obtain one or more sets of interference measurement resources and corresponding interference measurement receiving mode configurations; and respectively send interference measurement resource configurations and the interference measurement receiving mode configurations corresponding to the interference measurement resources to the user equipment.

The user equipment 1004 is configured to obtain the interference measurement resource configurations and the interference measurement receiving mode configurations; and perform the interference measurement according to the interference measurement resource configuration and the interference measurement receiving mode configuration.

It should be noted that preferred embodiments in the present embodiment may refer to related descriptions in the first embodiment and the second embodiment, and the descriptions will be omitted herein.

Sixth Embodiment

The embodiments of the present disclosure further provide a storage medium. Optionally, in the present embodiment, the above storage medium is configured to store the program code which executes the following steps:

S1, obtaining an interference measurement resource configuration and an interference measurement receiving mode configuration; and S2, performing an interference measurement according to the interference measurement resource configuration and the interference measurement receiving mode configuration.

Optionally, in the present embodiment, the storage medium may include, but is not limited to, a U Disk, a Read-only Memory (ROM), a Random Access Memory (RAM), a mobile hard disk drive, a magnetic disc, an optical disc or other mediums that can store program codes.

Optionally, specific examples in the present embodiment may refer to the examples described in the foregoing embodiments and the optional embodiments, and the specific examples are omitted herein.

Seventh Embodiment

The embodiments of the present disclosure further provide a storage medium. Optionally, in the present embodiment, the above storage medium is configured to store the program code which executes the following steps:

S1, obtaining one or more sets of interference measurement resources and corresponding interference measurement receiving mode configurations; and S2, respectively sending interference measurement resource configurations and the interference measurement receiving mode configurations corresponding to the interference measurement resources to user equipment.

Optionally, the storage medium is further configured to store program codes used to execute the following steps:

S3, dividing the interference measurement resources into a plurality of groups; and S4, respectively configuring indication signaling of receiving modes for measurement interference pilot resources in a plurality of groups of the measurement interference resources.

Optionally, in the present embodiment, the storage medium may include, but is not limited to, a U Disk, a Read-only Memory (ROM), a Random Access Memory (RAM), a mobile hard disk drive, a magnetic disc, an optical disc or other mediums that can store program codes.

Optionally, specific examples in the present embodiment may refer to the examples described in the foregoing embodiments and the optional embodiments, and the specific examples are omitted herein.

It will be apparent to those skilled in the art that the modules or steps of the above-described embodiments of the present disclosure may be implemented by a general computing device, they may be centralized on a single computing device or distributed over the network consisting of multiple computing devices, optionally, they may be implemented by program codes executable by the computing device, such that they may be stored in the storage device and executed by the computing device, and in some cases, the steps shown or described may be performed in a different order from that herein, or they may be separately fabricated into individual integrated circuit modules, or a plurality of the modules or steps may be implemented as a single integrated circuit module. Thus, the embodiments of the present disclosure are not limited to any specific combination of hardware and software.

Those described above are merely preferred embodiments of the present disclosure, but are not intended to limit the present disclosure, and there may be various changes and variations to the embodiments of the present disclosure for those skilled in the art. Any change, equivalent substitution, and improvement made within the spirit and principle of the present disclosure shall fall within the protection scope of the present disclosure.

INDUSTRIAL APPLICABILITY

Through the embodiments of the present disclosure, an interference measurement between a network-side device and UE will be performed after a corresponding receiving mode is pre-set according to an interference measurement resource configuration, therefore, the problem in the related art that since increasing of the number of receiving antennas leads to different interference measurement criteria among the UEs, the UE cannot objectively reflect the actual interference, and it is difficult for the network-side device to control interference measurement on the UE, can be solved, and effects that the UE better predicts true interference during transmission and more dimensions for interference coordination are provided for the network-side device are achieved.

What is claimed is:

1. An interference measurement method, comprising:
   determining an interference measurement resource and an interference measurement receiving mode corresponding to the interference measurement resource; wherein the interference measurement receiving mode includes at least one of: a receiving beam of a receiving antenna of a plurality of receiving antennas in an user equipment, a range of receiving direction of the receiving beam, or a receiving weight set between at least two receiving antennas of a same polarization direction or different polarization directions of the plurality of receiving antennas; and
   performing an interference measurement according to the interference measurement resource and the interference measurement receiving mode;
   wherein performing the interference measurement comprises:
   receiving and measuring an interference signal transmitted on the interference measurement resource according to the interference measurement resource receiving mode; dividing interference measurement resources into a plurality of groups; and respectively configuring indication signaling of receiving modes for measure interference pilot resources in a plurality of groups of the interference measurement resources;
   wherein the indication signaling of the interference measurement receiving modes is configured to indicate the user equipment to receive the interference measurement resource from at least one weight in a set of receiving weight codebook.

2. The method according to claim 1, wherein the interference measurement receiving mode is determined according to a configured receiving mode of a first type of signal.

3. The method according to claim 2, wherein the first type of signal comprises one of followings: a downlink measurement pilot, a downlink demodulation pilot, an uplink demodulation pilot, an uplink measurement pilot and an uplink random access signal.

4. The method according to claim 2, wherein a resource location of the first type of signal associated with the interference measurement receiving mode is determined according to a convention or indication information.

5. The method according to claim 4, wherein the resource location of the first type of signal comprises: a port, a time domain location; and the indication information is configured by a network-side device.

6. The method according to claim 1, wherein the interference measurement receiving mode is determined according to a beam selected and fed back by the user equipment.

7. The method according to claim 1, wherein the interference measurement receiving mode is determined according to a time domain location to which an interference measurement resource belongs.

8. An interference measurement indication method, comprising:
- determining an interference measurement resource and an interference measurement receiving mode corresponding to the interference measurement resource; wherein the interference measurement receiving mode includes at least one of: a receiving beam of a receiving antenna of a plurality of receiving antennas in an user equipment; a range of receiving direction of the receiving beam, or a receiving weight set between at least two receiving antennas of a same polarization direction or different polarization directions of the plurality of receiving antennas; and
- sending an interference measurement resource configuration corresponding to the interference measurement resource and an interference measurement receiving mode configuration corresponding to the interference measurement receiving mode to a user equipment, to enable the user equipment to determine the interference measurement resource and the interference measurement resource receiving mode corresponding to the interference measurement resource, and receive and measure an interference signal transmitted on the interference measurement resource according to the interference measurement resource receiving mode;
- dividing interference measurement resources into a plurality of groups; and respectively configuring indication signaling of receiving modes for measure interference pilot resources in a plurality of groups of the interference measurement resources;
- wherein the indication signaling of the interference measurement receiving modes is configured to indicate the user equipment to receive the interference measurement resource from at least one weight in a set of receiving weight codebook.

9. The method according to claim 8, wherein a grouping mode comprises at least one of followings: grouping the interference measurement resources in time domain; grouping the interference measurement resources in frequency domain; grouping a plurality of sets of interference measurement resources; and configuring, by a network-side device, indication information corresponding to the grouping mode.

10. The method according to claim 9, wherein the indication signaling is configured to indicate a type of a first type of signal associated with the interference measurement receiving mode; and the interference measurement receiving mode is determined according to a receiving mode corresponding to the associated first type of signal.

11. The method according to claim 9, wherein the indication signaling is configured to indicate a resource location of a first type of signal associated with the interference measurement receiving mode; and the interference measurement receiving mode is determined according to a receiving mode corresponding to the associated first type of signal.

12. The method according to claim 9, wherein the indication signaling is configured to indicate a transmitting beam associated with the interference measurement receiving mode.

13. The method according to claim 9, wherein the indication signaling is configured to indicate a feedback beam associated with the interference measurement receiving mode.

14. The method according to claim 9, wherein the indication signaling is configured to indicate a bundling relationship of receiving modes among the plurality of sets of interference measurement resources.

15. An interference measurement apparatus, comprising:
- a processor; and
- a memory for storing instructions executable by the processor;
- wherein the processor is configured to:
- determine an interference measurement resource and an interference measurement receiving mode corresponding to the interference measurement resource; wherein the interference measurement receiving mode includes at least one of: a receiving beam of the receiving antenna of a plurality of receiving antennas in an user equipment, a range of receiving direction of the receiving beam, or a receiving weight set between at least two receiving antennas of a same polarization direction or different polarization directions of the plurality of receiving antennas; and
- perform an interference measurement according to the interference measurement resource and the interference measurement receiving mode;
- wherein the processor is configured to realize performing the interference measurement by: receiving and measuring an interference signal transmitted on the interference measurement resource according to the interference measurement resource receiving mode;
- dividing interference measurement resources into a plurality of groups; and respectively configuring indication signaling of receiving modes for measure interference pilot resources in a plurality of groups of the interference measurement resources;
- wherein the indication signaling of the interference measurement receiving modes is configured to indicate the user equipment to receive the interference measurement resource from at least one weight in a set of receiving weight codebook.

16. The apparatus according to claim 15, wherein the interference receiving mode is determined by at least one of followings:
- determined according to configuration signaling of a network-side device; determined according to a configured receiving mode of a first type of signal; a resource location of a first type of signal associated with the interference measurement receiving mode is determined according to a convention or indication information; determined according to a transmitting beam configured by a network-side device; determined according to a beam selected and fed back by user equipment; and determined according to a time domain location to which an interference measurement resource belongs.

17. An interference measurement indication apparatus, comprising:
- a processor;
- a memory for storing instructions executable by the processor;
- wherein the processor is configured to perform the interference measurement method according to claim 8.

18. The apparatus according to claim 17, wherein the processor is further configured to:
- divide the interference measurement resources into a plurality of groups; and respectively configure indication signaling of receiving modes for measurement interference pilot resources in a plurality of groups of the interference measurement resources.

* * * * *